Jan. 29, 1946.  J. A. WILLS ET AL  2,393,851
AERIAL CAMERA MOUNT
Filed Aug. 31, 1943  4 Sheets-Sheet 3
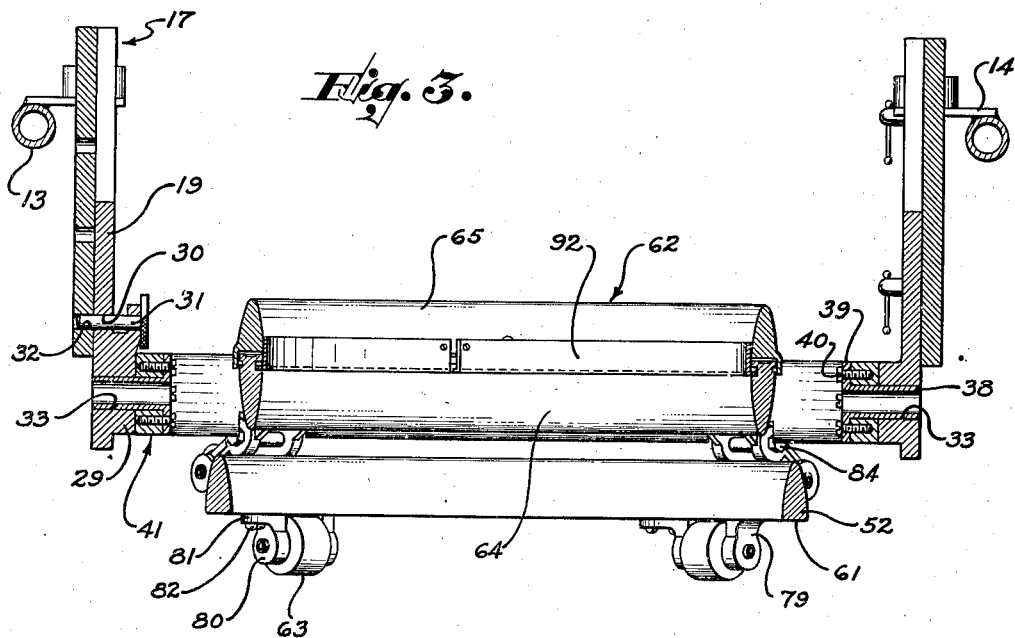
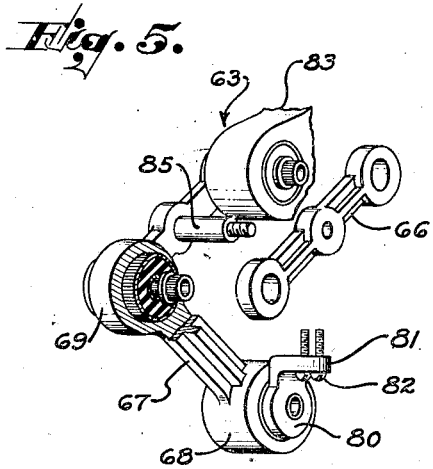
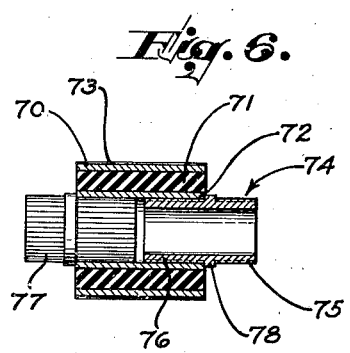
INVENTORS
JOHN A. WILLS
ELMER P. WHEATON
BY HARRIS, KIECH, FOSTER & HARRIS
FOR THE FIRM
ATTORNEYS

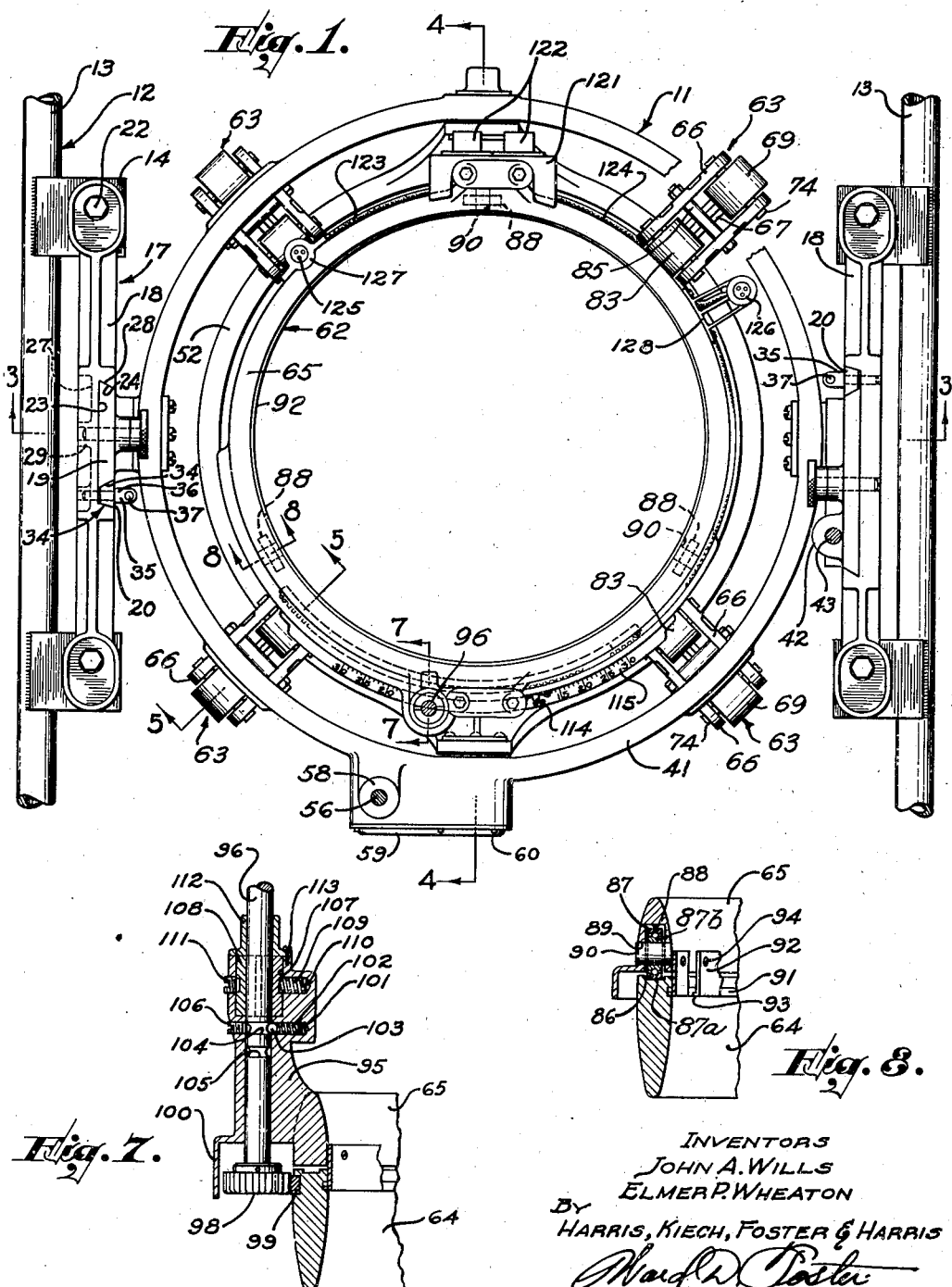

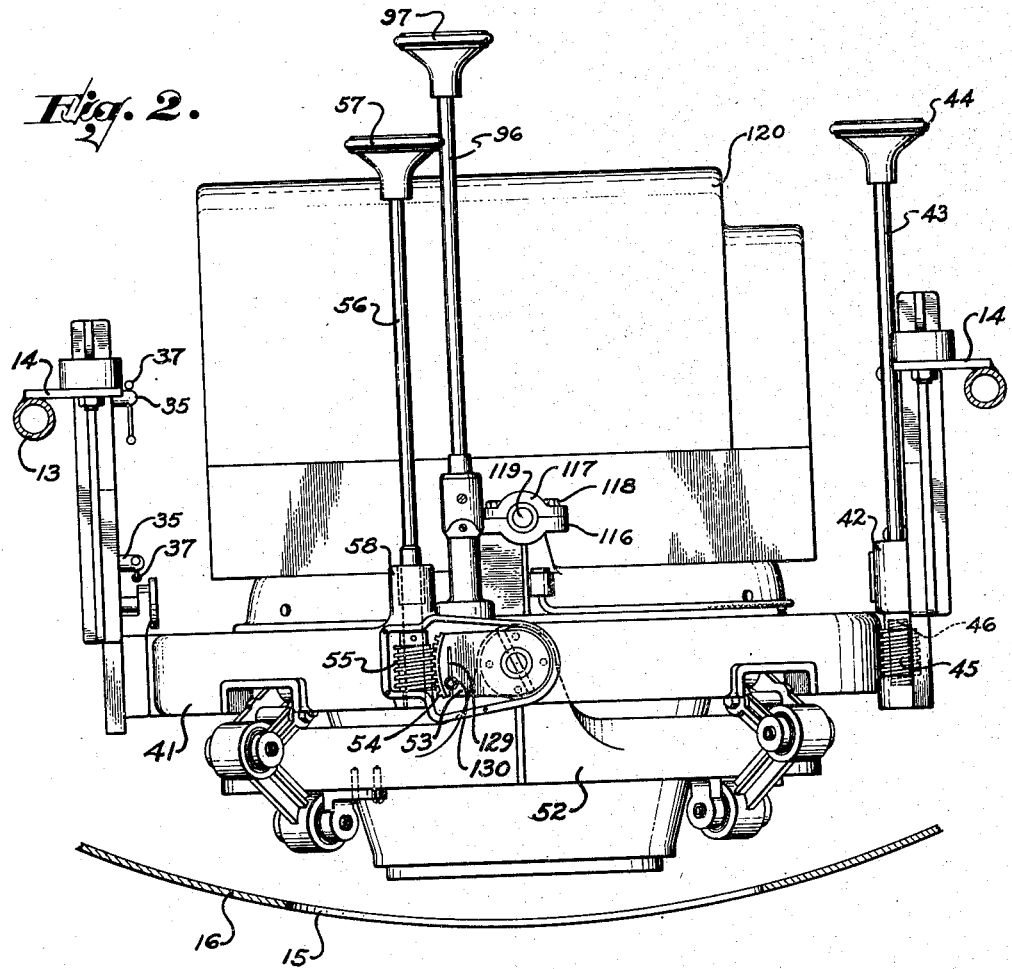

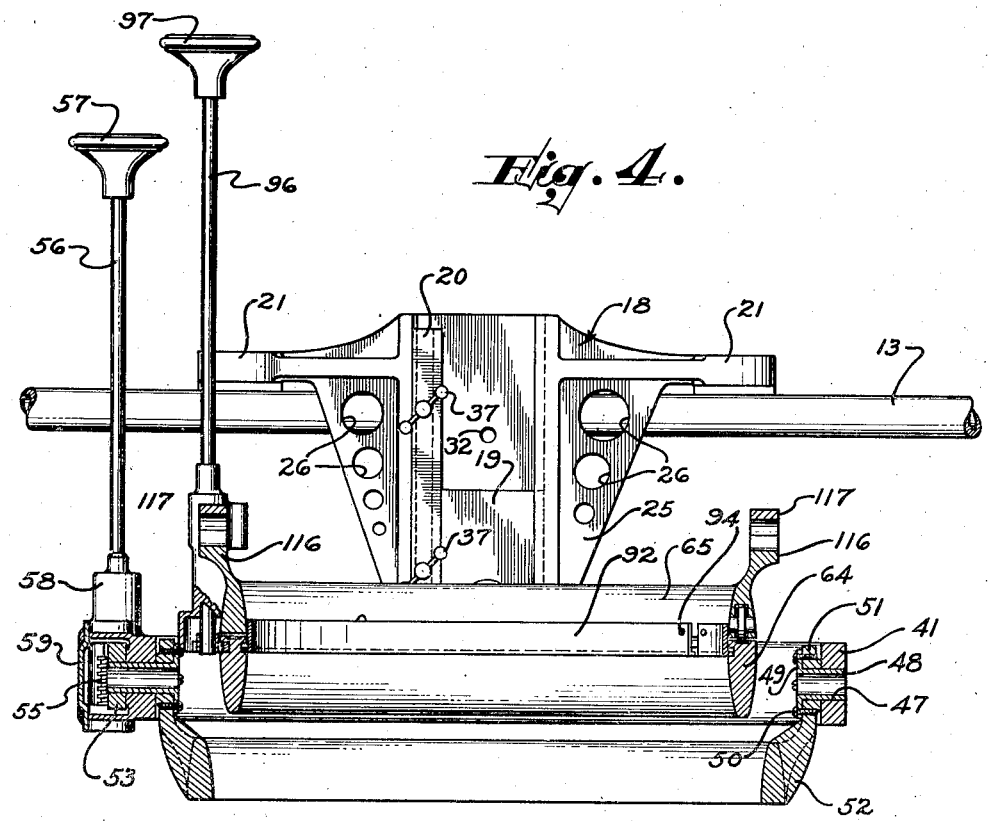

Patented Jan. 29, 1946

2,393,851

UNITED STATES PATENT OFFICE 2,393,851

AERIAL CAMERA MOUNT

John A. Wills, Altadena, and Elmer P. Wheaton, Los Angeles, Calif., assignors to Fairchild, Polley & Eliel, Inc., Los Angeles, Calif., a corporation of California Application August 31, 1943, Serial No. 500,656

30 Claims. (Cl. 248—179)

Our invention relates to an article-supporting device and, since it finds particular utility in a device for mounting a camera in a vehicle such as an airplane, an embodiment adapted for such use and the advantages provided thereby are described hereinafter, it being understood that our invention is not limited to such use. In taking photographs of the terrain from aircraft, as for example for the purpose of making a photographic map, it is necessary that the camera be maintained with its vertical and horizontal axes in a substantially constant position relative to the ground. It is impossible to maintain constant the positions of the vertical and horizontal axes of the aircraft relative to the ground because of variations in the rate of movement and density of the surrounding air.

It is necessary therefore to provide in a mount for such an aerial camera means for varying the position of the camera to compensate for tilt of the aircraft or vertical movement of its longitudinal horizontal axis relative to the ground, tip of the aircraft, or vertical movement of its transverse horizontal axis, and crabbing motion of the aircraft, or horizontal movement of its horizontal longitudinal axis relative to the ground. Since all of such movements of the aircraft necessitating a variation in the position of the camera relative to the aircraft are unpredictable as to both their extent and time of occurrence and change rapidly, it is necessary that such a mount for aerial camera be capable of adjustment to provide a compensating movement of the camera relative to the aircraft in a very short interval of time.

It is an object of our invention to provide a mount for such an aerial camera having means manually controllable for rapidly and accurately moving the camera to compensate for all of the above described movements of the aircraft in order to maintain the vertical and horizontal axes in the desired relationship with the earth in spite of any such movements of the aircraft.

Any of such movements of the aircraft for which compensastion must be made in the position of the camera may be so sudden in occurrence and violent in extent as to cause an undesirable movement of the camera relative to the aircraft, unless the mounting contains means restraining such movement. One of the objects of our invention is to provide a mount for an aerial camera which includes means associated with the means for adjusting the position of the camera relative to the aircraft which will prevent such movement of the camera in response to movement of the aircraft.

It is undesirable to alter the position of the camera relative to the aircraft by exerting force upon the mounting through the camera, because of the danger of damage to the camera; and it is one of the other objects of our invention to provide an aerial camera mount which may be readily adjusted by the operator to vary the position of the camera relative to the aircraft without touching the camera.

Aircraft in flight are unavoidably subjected to vibrations of relatively high frequency, this frequency being of the order of 1800 to 2500 cycles per minute. Such vibrations, if transmitted to the camera, render it extremely difficult and frequently impossible to take photographs satisfactory for mapping.

It is an object of our invention to provide a mount for an aerial camera including means for absorbing the vibration of the aircraft and preventing the transmission of such vibration to the camera to such an extent that photographs of substantially perfect definition may be secured. This object we accomplish by utilizing bodies of resilient material, such as rubber, interposed between the aircraft and the camera. The resilient properties of such material decrease at the low temperatures existing at those altitudes at which it is frequently desired to take aerial photographs, and it is desirable therefore that means be provided for retaining the desirable resilient properties of such material at such temperatures.

More specifically, it is an object of our invention to provide a mount for an aerial camera having bodies of resilient material interposed between the aircraft and the camera and absorbing the vibrations of the aircraft by variations in the torsion to which such resilient bodies are subjected in such manner as to retain the resilient properties of the bodies at all temperatures to which they are subjected for such use.

It is frequently desirable to employ in an aircraft having a fixed cradle or foundation for a camera mount aerial cameras of different cone lengths, while maintaining the lens of each different camera substantially in the plane of the floor of the aircraft and out of the air stream. Accordingly it is an object of our invention to provide a mount for an aerial camera which includes means for rapidly varying the position of the camera relative to the floor of the aircraft and securing the camera in any of a plurality of predetermined positions relative to the aircraft.

An embodiment of our invention capable of accomplishing these objects and providing such and other advantages is described in the following specification, in which reference is made to the accompanying drawings.

In the drawings:

Fig. 1 is a top plan view of an embodiment of the aerial camera mount of our invention;

Fig. 2 is an end elevational view of the mount illustrated in Fig. 1;

Fig. 3 is a vertical sectional view taken as indicated by the line 3—3 of Fig. 1;

Fig. 4 is a vertical sectional view taken as indicated by the line 4—4 of Fig. 1;

Fig. 5 is a perspective view partially sectioned of one of the vibration absorbing connections between the tilt ring and the lower crab ring with some of the parts removed to better illustrate the connection;

Fig. 6 is a longitudinal sectional view of one of the resilient joints in the connection illustrated in Fig. 5;

Fig. 7 is a fragmentary sectional view taken as indicated by the line 7—7 of Fig. 1; and Fig. 8 is a fragmentary sectional view taken as indicated by the line 8—8 of Fig. 1.

In the drawings the numeral 11 indicates generally a camera mount of our invention which is supported by a cradle 12 carried by the aircraft. The cradle 12 includes rods or bars 13 supported longitudinally within the aircraft and a pair of arms 14 extending inwardly and substantially horizontally from each of the rods 13. As illustrated in Fig. 2, the rods 13 and their associated arms 14 are spaced on each side of an opening 15 in the floor 16 of the aircraft.

The numeral 17 indicates a foundation or base means, best illustrated in Figs. 1, 3, and 4, as including a base member 18, a slide 19, and a gib 20. Each of the base members 18 includes horizontal arms 21 extending over the arms 14 of the cradle 12 and provided with openings registering with openings in the arms 14, so that the base member 18 may be secured thereto by bolts 22. Each base member 18 includes also a central depending body portion having formed therein a vertical way 23 having parallel side walls 24 at an angle other than a right angle with the plane of the base member 18. Each of the arms 21 is strengthened by connection to the depending body portion of the base member 18 through webs 25. Each base member 18 is preferably lightened by openings 26 formed in the webs 25 and recesses 27 formed in the side of the base member 18 opposite the way 23.

Each of the slides 19 is provided with side walls 28 converging inwardly of the cradle 13, one of which is adapted for sliding contact with one of the angled side walls 24 in the associated base member 18. Each of the slides 19 is provided with an inwardly extending boss 29 having therethrough an opening 30 for the reception of a set pin 31 extendable into any of a plurality of vertically spaced openings 32, illustrated as three in number, in the base member 18. Likewise, formed in each of the bosses 29 is a cylindrical opening 33 for a purpose to be later described.

The gib 20 is provided with side walls 34 diverging inwardly of the cradle 12 at angles permitting them to engage one of the side walls 28 of the slide 19 and one of the side walls 24 of the way 23. The gib 20 is formed of such transverse dimensions that it does not engage the bottom of the way 23 and is releasably secured for movement into and out of the way 23 by a plurality of bolts 35, illustrated as two in number, extending through the gib and threaded into the associated base member 18. Each of the bolts 35 has an enlarged head 36 for engagement with the inner surface of the associated gib 20 with a dumbbell-shaped hand lever 37 slidably extended therethrough to facilitate the rotation of the bolt 35.

Rotatably mounted in each of the cylindrical openings 33 in the bosses 29 is a cylindrical sleeve 38, best illustrated in Fig. 3. Each of the sleeves 38 is provided at its inner end with an outwardly extending flange or collar 39 secured by screws 40 to the inner periphery of a first supporting member or ring 41. The first ring 41 with its attached sleeves 38 is rotatable relative to the base means 17 about a first axis which is transverse of the aircraft. One of the slides 19 is provided with a vertically extending boss 42 in which is journalled a tip adjusting rod 43 having at its upper end a tip control knob 44. The tip adjusting rod 43 is provided at its lower end with a worm gear 45 meshing with a segmental rack 46 carried at one end of an arm, the other end of which is secured to one of the cylindrical sleeves 38 in a manner described in greater detail hereinafter.

The tip ring 41 is provided with diametrically opposed cylindrical openings 47, the axis of which is at a right angle to and substantially in the plane of the axis of the cylindrical sleeves 38.

Rotatably mounted in each of the cylindrical openings 47 is a cylindrical sleeve or trunnion 48 having at its inner end an outwardly projecting flange or collar 49 secured by screws 50 to the inner surface of an upwardly projecting ear 51 formed on a second supporting member or ring 52. Non-rotatably secured to the outer end of one of the trunnions 48 is one end of an arm 53, the other end of which is provided with a segmental rack 54.

As is best illustrated in Fig. 2, the rack 54 is concentric with the axis of the associated trunnion 48 and meshes with a worm gear 55 carried on the lower end of a tilt adjusting rod 56 which is provided at its upper end with a tilt control knob 57. The tilt adjusting rod 56 is journalled in an upwardly extending boss 58 formed on the first ring 41 so that upon rotation of the worm gear 55 by manipulation of the tilt adjusting rod 56 the arm 53, and hence the second ring 52, is rotated about a second axis which is at a right angle to and in substantially the same plane as the first axis about which the first ring 41 is rotated.

As is best illustrated in Fig. 1, the boss 58 is formed to surround the arm 53 and its associated trunnion 48 and is closed by a cover plate 59 secured thereto by screws 60. The segmental rack 46 is connected to one of the cylindrical sleeves 38 associated with the first ring 41 by an arm identical with the arm 53, the boss 42 being like the boss 58 formed to surround such arm and its associated sleeve 38 and to be closed with a cover plate similar to the cover plate 59.

As is well illustrated in Fig. 3, the first ring 41 is preferably formed with horizontal upper and lower surfaces and vertical side walls, while the second ring 52 is preferably formed semi-elliptical in cross section with its lower surface 61 substantially flat.

The second ring 52 is connected to a third supporting member 62 by a plurality of vibration absorbing connecting means or torsion linkages 63, illustrated as four in number, and equally spaced around the second ring 52. The third supporting member 62 includes a lower crab ring 64 and an upper crab ring 65, the two crab rings being substantially semi-elliptical in cross section, of equal radial dimensions, and so positioned together that their joint cross section is substantially elliptical. Since all of the torsion linkages 63 are identical in construction, only one of such linkages will be described in detail.

Referring to Figs. 3, 5, and 6, it will be seen that each of the torsion linkages 63 includes a pair of upper arms 66 and a lower arm 67. The arm 67 is provided at its lower and upper ends with cylindrical hubs 68 and 69 respectively. Within each of the hubs 68 and 69 is an outer cylindrical metal sleeve 70, an intermediate cylindrical sleeve 71 of a resilient and deformable material, which is preferably rubber, and an inner cylindrical metal sleeve 72.

The resilient sleeve 71 is positioned between the outer and inner sleeves 70 and 72 by placing upon the inner sleeve 72 a tube of resilient material having a normal internal diameter substantially equal to the outer diameter of the inner sleeve 72. The tube of resilient material is then stretched axially, bringing it into tight pressural contact with the inner sleeve 72 and reducing the external diameter of the resilient tube.

While the resilient tube is so stretched the outer sleeve 70 is positioned around it and thereafter the tension upon the resilient sleeve 71 is released, permitting the resilient sleeve to contract axially and expand circumferentially. The sleeves 70, 71, and 72 are then cut into appropriate axial lengths. The resilient sleeve 71 is thus elongated axially and compressed radially from its normal shape. The outer sleeve 70 is provided with axial serrations or knurls 73 and is formed of hardened metal and of such dimensions that it may be driven into either the lower or upper hubs 68 or 69, so that it will resist rotation relative thereto.

The numeral 74 indicates a fitting in the form of a sleeve having outer and inner portions 75 and 76, respectively, provided with axial serrations or knurls 77 upon their outer surfaces, the portions being separated by an annular radially projecting shoulder 78. The fitting 74 is formed of hard metal, and the inner portion is of such dimensions that it may be driven into the inner sleeve 72 until the annular shoulder 78 contacts the end of this sleeve when the engagement of the knurled outer surface with the inner sleeve 72 will prevent relative rotation of the fitting 74 and the sleeve 72. One of the fittings 74 is driven into each end of the inner sleeve 72 associated with the lower hub 68, and the outer sleeve 70 is in a similar manner driven into the lower hub 68.

The outer portion 75 of one of the fittings 74 is driven into a cylindrical opening in a lug 79, depending from and formed integral with the lower surface 61 of the second ring 52. The outer portion 75 of the other fitting 74 is driven into a cylindrical opening of a depending arm 80 of a bracket 81, which is secured by screws 82 to the lower surface 61 of the second ring 52.

The upper hub 69 is provided with an outer sleeve, a resilient sleeve, an inner sleeve, and two fittings, such as the sleeves 70, 71, and 72 and fitting 74 previously described. The outer portions of the fittings 74 are secured in the manner hereinbefore described to the lower end of the upper arms 66. The upper ends of the arms 66 are secured to the outer portions 75 of fittings 74, which, together with an outer sleeve, a resilient sleeve, and an inner sleeve, similar to the sleeves 70, 71, and 72, are assembled in the manner hereinbefore described within a boss 83 formed integral with and depending from the lower crab ring 64. The upper arms 66 may be forced together upon the outer portions 75 of the fittings 74 assembled within the upper hub 69 and the boss 83 by threading a nut 84 upon a bolt 85 connecting the arms 66 intermediate their ends.

The lower crab ring 64 is provided at its upper surface with an annular recess 86 for the reception of an outer race 87a of a ball bearing 87, whereby the outer ball race 87a serves as a roller and the annular recess 86 serves as a track therefor. The upper crab ring 65 is provided in its lower surface with a plurality of recesses 88, illustrated as three in number, each of such dimensions as to receive one of the ball bearings 87. The upper crab ring 65 is provided with a cylindrical radially disposed opening 89 extending transversely of the middle of each of the recesses 88 for the introduction of a pin 90 therethrough into non-rotatable engagement with an inner race 87b of the ball bearing 87 positioned in such recess. Provision is thus made for the upper crab ring 65 to rotate upon the lower crab ring 64.

Formed in the inner surface of the lower crab ring 64 adjacent its upper edge is an annular groove 91. A locking member 92 is provided in the form of an incomplete annulus having at its lower end an outwardly extending flange 93 of such dimensions as to be slidably received in the annular groove 91. By contracting the locking member 92 until its ends abut, it may be positioned with its flange 93 within the annular groove 91, when the compressive force upon the locking member 92 may be released, permitting it to expand into contact throughout its length with the lower crab ring 64 and the upper crab ring 65. The locking member 92 is then secured to the upper crab ring 65 as by a plurality of screws 94, thus securing the upper crab ring 65 against displacement relative to the lower crab ring 64, while permitting the upper crab ring 65 to rotate upon the lower crab ring 64.

The upper crab ring 65 is provided with an upwardly extending boss 95 which journals a crab adjusting rod 96 having at its upper end a control knob 97. The crab adjusting rod 96 is provided at its lower end with a pinion 98, best illustrated in Fig. 7, which meshes with a segmental rack 99 connected to the periphery of the lower crab ring 64 and concentric therewith. As is illustrated in Figs. 1, 7, and 8, the boss 95 includes a depending flange 100 extending to approximately the level of the lower edge of the rack 99 for somewhat more of the periphery of the lower crab ring 64 than the rack 99 and extending somewhat below the upper surface of and adjacent the periphery of the lower crab ring 64 for the remainder of the periphery of such ring.

Formed in the boss 95 diametrically of the crab adjusting rod 96 is a cylindrical opening 101 threaded adjacent its outer end. A light compression spring 102 is positioned in the cylindrical opening 101 and resiliently urges a ball 103 into engagement with the crab adjusting rod 96. The crab adjusting rod 96 is provided with an annular groove 104 for the reception of the ball 103 when the crab adjusting rod 96 is in the position illustrated in Fig. 7 with the pinion gear 98 meshing with the rack 99.

A lower annular groove 105 is formed in the crab adjusting rod 96 for the reception of the ball 103 when the rod 96 is moved upwardly, so that the pinion gear 98 is out of meshing relationship with the rack 99. The crab adjusting rod 96 may thus be retained either in or out of meshing relationship with the rack 99, being capable of actuation between such positions by the application of slight force to the crab control knob 97. The cylindrical opening 101 is closed by a screw 106 threaded into its outer portion.

The boss 95 is also provided with an enlarged bore 107 adjacent its upper end. Positioned within the enlarged bore 107 are two brake blocks 108 formed of metal or the like and extending for somewhat less than 180° around the crab adjusting rod 96. A compression spring 109 is positioned within a cylindrical recess 110 formed in the boss 95 and communicating with the enlarged bore 107, so that it resiliently urges one of the brake blocks 108 into pressural contact with the crab adjusting rod 96. Threaded into an opening in the hub 95 coaxially with the cylindrical recess 110 is an adjusting screw 111. The brake blocks 108 have sufficient play within the cylindrical bore 107 that their pressural contact may be varied by the manipulation of the adjusting screw 111 to vary the resistance offered to the rotation of the crab adjusting rod 96. This resistance may thus readily be made of that order of magnitude sufficient to prevent the rotation of the upper crab ring 65 upon the lower crab ring 64 in response to movements of the aircraft when the pinion 98 is in meshing relationship with the rack 99. The elevation of the crab adjusting rod 96 to position where the ball 103 is received in the lower groove 105 permits the operator to quickly rotate the upper crab ring 65 relative to the lower crab ring 64 in either direction by movement of the crab control knob 97 until the upper crab ring reaches approximately the desired position to compensate for crab of the aircraft. Thus, the upper ring 65 is rotated about an axis which is normally substantially perpendicular to the axis provided by the bearing sleeves 38 and also is in the same plane therewith. Similarly, the axis about which the upper ring 65 rotates is perpendicular to the axis of the bearing sleeves 48 and lies in that plane also.

The pinion gear 98 may then be lowered into meshing relationship with the rack 99 so that final and accurate adjustment of the upper crab ring 65 may be made by rotation of the crab control knob 97. The lower ends of the teeth of the pinion gear 98 are beveled to facilitate the movement of this gear into mesh with the rack 99.

The brake blocks 108 are retained within the enlarged bore 107 by a cap 112 surrounding the crab adjusting rod 96 and secured to the upper end of the boss 95 by a lock screw 113.

The upper crab ring 65 is provided with an indicator 114 projecting from its periphery over and adjacent to a scale 115 mounted upon the lower crab ring 64 and bearing suitable indicia, such as degrees of rotation of the upper crab ring 65 relative to the lower crab ring 64 in both directions and neutral position.

Formed upon and extending upwardly from the upper crab ring 65 are diametrically opposed brackets 116, each provided with a complementary cap 117. Bolts 118 are extended through the caps 117 into the brackets 116 to clamp upon such bracket supports 119 extending from an aerial camera 120 so that the camera is rigidly secured to the upper crab ring 65.

Likewise formed upon the upper crab ring 65 and projecting radially therefrom is a housing 121 having standard electrical connections 122 adapted for the reception of electrical connectors of standard design. The connections 122 are each connected to an electrical conductor, the conductors being led through insulating tubes 123 and 124, carried by the upper crab ring 65, and terminating in electrical connectors 125 and 126, respectively, which are supported in position convenient for the reception of plugs electrically connected to the camera by brackets 127 and 128, respectively, which are secured to the upper crab ring 65.

Means for restraining the rotation of the first ring 41 and the second ring 52 are provided by a slot 129 formed in the arm 53 associated with the latter and in the arm carrying the segmental rack 46 associated with the former extending from one side of each arm to adjacent the other side thereof and a frusto-conical adjusting screw 130 threaded into an opening in such arm. The slot 129 extends diametrically through such openings, so that threading the adjusting screw 130 into the arm widens the slot 129, thus forcing the segmental rack 46 or 54 into greater pressural contact with its associated worm gear 45 or 55, respectively. This pressural contact may be readily varied until it reaches that value at which rotation of the first ring 41 and the second ring 52 responsive to movements of the aircraft is prevented.

After a determination of the focal length of the aerial camera which it is desired to secure upon the camera mount, the gibs 20 are loosened in the ways 23 of the base members 18 by rotating the bolts 35. The set pins 31 are then removed from the openings 30 and 32, permitting the slides 19 to be moved vertically in the ways 23 until the openings 30 in the slides register with the desired openings 32 in the base members 18. The set pins 31 are then inserted into the registering openings, while gibs 20 are moved inwardly of the ways 23 to securely wedge the slides 19 within such ways. It will be apparent from Fig. 1 that the movement of the gibs 20 inwardly of the ways 23 wedges the slides 19 between the gibs and the opposite side walls 24 of the ways 23 to secure the slides 19 against movement relative to the base members 18. Such a wedging action may be accomplished very quickly by the rotation of the hand levers 37 carried by the bolts 35.

The camera 120 is then secured to the upper crab ring 65 by clamping its supports 119 between the caps 117 and the brackets 116.

During flight, variations in the pitch or tip of the aircraft or variation of its longitudinal axis from the horizontal may be quickly compensated for by rotation of the tip control knob 44. Such rotation through the worm gear 45 and the segmental gear 46 rotates the first ring 41 relative to the slides 19 about a first axis which is transverse of the aircraft.

During flight, variations in the tilt of the aircraft or variations from the horizontal of its transverse axis may be quickly and accurately compensated for by rotation of the tilt control knob 57. Such rotation through the worm gear 55, segmental gear 54, and arm 53 rotates the second ring 52 in the desired direction about a second axis parallel to the longitudinal axis of the aircraft and at a right angle to the first axis.

Likewise during flight, variations in the crab of the aircraft or variations of the longitudinal axis of the aircraft from coincidence with the direction of true flight may be rapidly compensated for by manipulation of the crab control knob 97. If the crab control knob 97 be lifted until the ball 103 is received in the lower groove 104 of the crab control rod 96, the upper crab ring 65 may be rotated in either direction relative to the lower crab ring 64 by appropriate pressure upon the crab control knob 97 until approximately the desired position of the upper crab ring 65 is secured. The pinion gear 98 may then be lowered into mesh with the ack 99, whereupon the operator by rotation of the crab control knob 97 can quickly move the upper crab ring 65 to the exact position necessary to compensate for the crab of the aircraft. It will be noted that the adjustment for crab is made entirely by the manipulation of a single control knob with one hand of the operator. The indicator 114 accurately indicates upon the scale 115 in degrees the crab of the aircraft for which compensation has been made.

The operator by such adjustments is thus enabled to compensate entirely for all movements of the aircraft within a very few seconds and without exerting any force directly upon the camera.

The lower crab ring 64, upper crab ring 65, and camera 120 are supported solely by the torsional resistance of the resilient sleeves 71, which, as previously explained, are under tension. The vibrations are absorbed by variations in the torsion to which the twelve resilient sleeves 71 included in the four torsion linkages 63 are subjected. Since a great deal more vibration can be absorbed by variations in torsion than by variations in either compression or tension to which a resilient body is subjected, it will be understood that the resilient sleeves 71 effectively absorb substantially all of the vibrations from the aircraft and prevent their transmission to the camera.

We have found that the resilient sleeves 71 are capable of absorbing substantially more than 85 per cent of vibrations of a frequency of 1800 to 2500 cycles per minute with a maximum amplitude of .02 inch.

The energy of the absorbed vibrations is dissipated as internal friction within the resilient sleeves 71, generating heat therein. This generated heat is extremely beneficial in maintaining the resilient properties of the sleeves 71 at the extremely low temperatures to which the sleeves are subjected in flights at high altitudes. It will be noted that each of the torsion linkages 63 is so formed as to permit the second supporting member or ring 52 to move into planes spaced at different distances from the third supporting member or ring 62, which planes are parallel to the third supporting member.

The movement of the camera relative to the mount 11 in response to variations in tip or tilt of the aircraft is prevented by the resistance to the rotation of the tip and tilt control rods 43 and 56, respectively, by the pressural contact of the segmental racks 46 and 54 with the worm gear 45 and 55, respectively, which these rods carry. As previously explained, the value of these pressural contacts may be varied by manipulation of the adjusting screws 130.

The movement of the camera relative to the mount 11 in response to variations in the crab of the aircraft is prevented by the resistance to the rotation of the crab control rod 96 afforded by the contact therewith of the brake blocks 108, the pressure of such contact being adjusted to any value necessary to accomplish this purpose by manipulation of the adjustment screw 111 as previously described.

While that embodiment of our invention hereinbefore illustrated and described performs the objects and provides the advantages primarily stated, our invention may be embodied in various other forms and is to be understood therefore as not restricted to the specific forms hereinbefore set forth but as including all modifications and variations thereof coming within the scope of the claims which follow.

We claim as our invention:

1. In an article-supporting device, the combination of: base means; a first supporting member adapted for rotation relative to said means about a first axis; a second supporting member so connected to said first supporting member as to be rotatable relative to said first supporting member about a second axis at substantially a right angle with said first axis; and a third supporting member adapted to support the article and so connected to said second supporting member as to be rotatable relative to said second supporting member about a third axis at substantially a right angle with said second axis and in the same plane with said first axis, said first and second axes lying in substantially parallel planes and said third axis being normally substantially perpendicular to said parallel planes.

2. In an article-supporting device, the combination of: base means; a first supporting member adapted for rotation relative to said means about a first axis; a second supporting member so connected to said first supporting member as to be rotatable relative to said first supporting member about a second axis at substantially a right angle with said first axis; a third supporting member adapted to support the article and so connected to said second supporting member as to be rotatable relative to said second supporting member about a third axis at substantially a right angle with said second axis and in the same plane with said first axis; and means for connecting said first supporting member to said base means in any of a plurality of spaced positions.

3. In an article-supporting device, the combination of: base means; a first supporting member adapted for rotation relative to said means about a first axis; a second supporting member so connected to said first supporting member as to be rotatable relative to said first supporting member about a second axis at substantially a right angle with said first axis; a third supporting member adapted to support the article and so connected to said second supporting member as to be rotatable relative to said second supporting member about a third axis at substantially a right angle with said second axis and in the same plane with said first axis; a connecting member associated with said first supporting member; and means including a pin adapted for reception in openings in said connecting member and said first supporting member for connecting such members in any of a plurality of positions.

4. In an article-supporting device, the combination of: base means having a way therein; a first supporting member adapted for rotation relative to said means about a first axis; a second supporting member so connected to said first supporting member as to be rotatable relative to said first supporting member about a second axis at substantially a right angle with said first axis; a third supporting member adapted to support the article and so connected to said second supporting member as to be rotatable relative to said second supporting member about a third axis at substantially a right angle with said second axis and in the same plane with said first axis; a connecting member associated with said first supporting member and slidable in said way; and means including a gib and means for locking it in said way for securing said connecting member to said base means in any of a plurality of spaced positions.

5. In a camera mount, the combination of: a base member having therein a way with outwardly converging side walls; a first ring adapted for rotation relative to said member about a first axis; a second ring so connected to said first ring as to be rotatable relative thereto about a second axis at substantially a right angle with said first axis; a third ring adapted for connection to a camera and so connected to said second ring as to be rotatable relative thereto about a third axis at substantially a right angle with said second axis and in the same plane with said first axis; a slide connected to said first ring and received in said way; a gib in said way; and means releasably locking said gib in said way against said slide, whereby said rings may be secured in any of a plurality of spaced positions relative to said base member.

6. In a camera mount, the combination of: a base member having therein a way with outwardly converging side walls; a first ring adapted for rotation relative to said member about a first axis; a second ring so connected to said first ring as to be rotatable relative thereto about a second axis at substantially a right angle with said first axis; a third ring adapted for connection to a camera and so connected to said second ring as to be rotatable relative thereto about a third axis at substantially a right angle with said second axis and in the same plane with said first axis; a slide connected to said first ring and received in said way; a gib in said way; means releasably locking said gib in said way against said slide, whereby said rings may be secured in any of a plurality of predetermined spaced positions relative to said base member; and pin means adapted for retaining said slide in any of such positions when said locking means is released by extension into openings in said slide and said base member.

7. In an article-supporting device, the combination of: base means; a first supporting member adapted for rotation relative to said means about a first axis; a second supporting member so connected to said first supporting member as to be rotatable relative to said first supporting member about a second axis at substantially a right angle with said first axis; and a third supporting member comprising two elements, one of which is adapted for supporting the article and rotating relative to the other of said elements about a third axis at substantially a right angle with said second axis, said other element being connected to said second supporting member.

8. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member adapted for connection to the article and so connected to said second supporting member as to be rotatable relative thereto about a third axis at substantially a right angle with said second axis; and manually operable control means associated with said base member and said first and second supporting members adapted for independently rotating said first, second, and third supporting members respectively.

9. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member adapted for connection to the article and so connected to said second supporting member as to be rotatable relative thereto about a third axis at substantially a right angle with said second axis; and gear means associated with each of said supporting members and manually operable for independently rotating said supporting members.

10. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member adapted for connection to the article and so connected to said second supporting member as to be rotatable relative thereto about a third axis at substantially a right angle with said second axis; control means connected to each of said supporting members and independently operable for rotating said supporting members; and means resisting the rotation of each of said supporting members, whereby their rotation responsive to movement of said base member is prevented.

11. In a camera mount, the combination of: a base member; a first ring so pivotally connected to said member as to be rotatable relative thereto about a first axis; a second ring so pivotally connected to said first ring as to be rotatable relative thereto about a second axis at substantially a right angle with said first axis; a third ring adapted for connection to a camera and so connected to said second ring as to be rotatable about a third axis at substantially a right angle with said second axis; a first gear means connecting said base member and said first ring; a second gear means connecting said first and second rings; and a third gear means connecting said second and third rings, each of said gear means being manually operable independently for inducing relative rotation of said rings connected thereto.

12. In a camera mount, the combination of: a base member; a first ring so pivotally connected to said member as to be rotatable relative thereto about a first axis; a second ring so pivotally connected to said first ring as to be rotatable relative thereto about a second axis at substantially a right angle with said first axis; a third ring adapted for connection to a camera and so connected to said second ring as to be rotatable about a third axis at substantially a right angle with said second axis; a first gear means connecting said base member and said first ring adjacent their pivotal connection; a second gear means connecting said first and second rings adjacent their pivotal connection; and a third gear means connecting said second and third rings, each of said gear means being manually operable independently for inducing relative rotation of said rings connected thereto.

13. In a camera mount, the combination of: a base member; a first ring so pivotally connected to said member as to be rotatable relative thereto about a first axis; a second ring so pivotally connected to said first ring as to be rotatable relative thereto about a second axis at substantially a right angle with said first axis; a third ring adapted for connection to a camera and so connected to said second ring as to be rotatable about a third axis at substantially a right angle with said second axis; a first gear means connecting said base member and said first ring; a second gear means connecting said first and second rings; a third gear means connecting said second and third rings; and a control member associated with each of said gear means, each of said control members being manually operable to rotate one of said rings by actuation of said gear means and one of said control members being operable for actuating said associated gear means to inoperative position and for rotating said ring associated therewith independently of said associated gear means.

14. In a camera mount, the combination of: a base member; a first ring so pivotally connected to said member as to be rotatable relative thereto about a first axis; a second ring so pivotally connected to said first ring as to be rotatable relative thereto about a second axis at substantially a right angle with said first axis; a third ring adapted for connection to a camera and so connected to said second ring as to be rotatable about a third axis at substantially a right angle with said second axis; means connected with each of said rings and manually operable independently for inducing independent relative rotation of said rings connected thereto; retarding means associated with and resisting rotation of each of said rings; and means adapted for varying the resistance of said retarding means to rotation of said ring associated therewith, whereby rotation of said rings responsive to movement of said base member is prevented.

15. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member comprising two elements, one of which is adapted for supporting the article and rotating relative to the other of said elements about a third axis normally at substantially a right angle with said first axis and with said second axis, said other element being connected to said second supporting member; and manually operable control means associated with said base member and said first and second supporting members adapted for independently rotating said first and second supporting members and said rotatable element of said third supporting member respectively.

16. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member adapted for connection to the article; and a resilient body under torsion connecting said third and second supporting members and absorbing vibrations of said base member by deformation responsive to variations in torsion applied thereto.

17. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member adapted for connection to the article; a first link connected to said second supporting member; a second link connected to said third supporting member; and a body of resilient material under tension so connecting said links that said second supporting member is movable between planes parallel to and at different distances from said third supporting member responsive to variations in torque applied to said resilient body by movement of said base member.

18. In a camera mount, the combination of: a base member; a first ring so pivotally connected to said member as to be rotatable relative thereto about a first axis; a second ring so pivotally connected to said first ring as to be rotatable relative thereto about a second axis at substantially a right angle with said first axis; a third ring adapted for connection to a camera; a plurality of pivotally connected links; and resilient bodies under tension so connecting said links to each other and to said second and third rings as to allow movement of said second ring between planes parallel to said third ring and to absorb vibrations of said base member by variations in torsion.

19. In an article-supporting device, the combination of: a base member; a first supporting member so connected to said base member as to be rotatable relative thereto about a first axis; a second supporting member so connected to said first supporting member as to be rotatable relative thereto about a second axis at substantially a right angle to said first axis; a third supporting member comprising two elements, one element of which is adapted for supporting the article and rotating relative to the other of said elements about a third axis at substantially a right angle with said second axis, said other element being connected to said second supporting member; and a resilient body under torsion connecting said other element of said third supporting member to said second supporting member and absorbing vibrations of said base member by deformation responsive to variations in torsion applied thereto.

20. In a camera mount, the combination of: a base member; a plurality of supporting rings, one of said rings being rotatably mounted upon said base, said rings being rotatably carried one within another on axes at right angles to one another; and separate gear means for the respective rings and adapted to adjust the relative positions of said rings.

21. In an article-supporting device, the combination of: a base member; a first supporting member operatively connected with said base member and adapted to rotate about a first horizontal axis; a second supporting member rotatably mounted upon said first supporting member and adapted to rotate about a second horizontal axis at right angles to said first axis; a third supporting member carried by said second supporting member and rotatable about an axis normally substantially perpendicular to said horizontal axes; and means for each supporting member adapted to adjust the respective supports about their respective axes.

22. In an article-supporting device, the combination of: a base member; a first ring pivotally connected with said base member and adapted to rotate about a first axis; a second ring including upper and lower ring members having a common axis passing through their centers and perpendicular to their planes and also perpendicular to said first axis, the lower member being supported by said first ring, and said upper member being adapted to support an article, said upper member being rotatable upon said lower member about said common axis perpendicular to said first axis; and means for rotating said upper member.

23. A combination according to claim 22 including a plurality of groups of links supporting said second ring upon said first ring; and resilient means connecting links of each group under torsion and adapted to absorb vibrations imparted to said first ring.

24. In an article-supporting device, the combination of: a base member; a first support pivotally connected with said base member and rotatable about a first horizontal axis; a second support pivotally connected with said first support and rotatable about a second horizontal axis; and a third support adapted to support an article, said third support comprising an upper member and a lower member, the upper member being rotatable upon the lower member about a vertical axis.

25. A camera mount comprising in combination: a base member; a first supporting member pivotally mounted on said base member; a second supporting member; and a plurality of groups of links pivotally connecting said second supporting member with said first supporting member; and resilient means connecting the links of each group and adapted to absorb vibration.

26. A combination according to claim 25 wherein links of each group are pivotally connected together and each resilient means is a torsion means in the form of a tensioned rubber body disposed in said pivotal connection.

27. In a camera mount, the combination of: a base member; a first ring pivotally connected with said base member and rotatable about a first axis; a second ring pivotally connected with said first ring and rotatable about a second axis substantially at right angles to said first axis; a third ring adapted to support a camera; a plurality of groups of links pivotally connecting said third ring with said second ring; and resilient means between said second and third rings, said links and means resiliently supporting said third ring upon said second ring.

28. A combination according to claim 27 wherein links of each group are pivotally connected together and each resilient means includes a tensioned rubber body about the pivotal connections between the links, the rubber bodies being adapted to absorb vibration.

29. A combination according to claim 27 wherein said third ring comprises upper and lower members, the lower member being carried by said links, and the upper member being rotatable on the lower member and adapted to carry the camera.

30. In an article-supporting device, the combination of: a base member; a first ring pivotally connected with said base member and adapted to rotate about a first axis; a second ring including upper and lower ring members, the lower member being supported by said first ring, and said upper member being adapted to support an article, said upper member being rotatable upon said lower member about an axis perpendicular to said first axis; means for rotating said upper member; a plurality of pairs of links supporting said lower member upon said first ring; and resilient means connecting the links of each pair for resiliently supporting said second ring upon said first ring.

JOHN A. WILLS.
ELMER P. WHEATON.